(12) United States Patent
Nishimura

(10) Patent No.: US 7,890,244 B2
(45) Date of Patent: Feb. 15, 2011

(54) INTERNAL COMBUSTION ENGINE

(75) Inventor: Taichi Nishimura, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 553 days.

(21) Appl. No.: 11/997,975

(22) PCT Filed: Aug. 3, 2006

(86) PCT No.: PCT/JP2006/315789

§ 371 (c)(1),
(2), (4) Date: Feb. 5, 2008

(87) PCT Pub. No.: WO2007/018255

PCT Pub. Date: Feb. 15, 2007

(65) Prior Publication Data

US 2010/0222989 A1    Sep. 2, 2010

(30) Foreign Application Priority Data

Aug. 8, 2005    (JP) .............................. 2005-229609

(51) Int. Cl.
*G06F 19/00* (2006.01)
*F01L 1/34* (2006.01)
*F02D 41/06* (2006.01)
*F02B 75/12* (2006.01)

(52) U.S. Cl. .................... 701/113; 701/103; 123/90.17; 123/179.18; 123/316; 123/435

(58) Field of Classification Search .............. 123/90.11, 123/90.15–90.18, 92.27, 90.31, 179.16, 179.18, 123/182.1, 316, 435; 701/101–105, 110, 701/111, 113, 115

See application file for complete search history.

(56) References Cited

U.S. PATENT DOCUMENTS

| 5,417,186 A | * | 5/1995 | Elrod et al. | ............... 123/90.17 |
| 6,023,929 A | | 2/2000 | Ma | |
| 6,332,445 B1 | | 12/2001 | Voss et al. | |
| 6,536,389 B1 | * | 3/2003 | Shelby et al. | ............ 123/90.15 |
| 6,557,505 B1 | | 5/2003 | Hori | |
| 7,207,300 B2 | * | 4/2007 | Ezaki et al. | ............... 123/90.16 |

(Continued)

FOREIGN PATENT DOCUMENTS

JP    01-315631 A    12/1989

(Continued)

OTHER PUBLICATIONS

Japanese Office Action corresponding to Japanese Patent Application No. 2005-229609 dated May 11, 2010 (with translation) (6 pages.)

*Primary Examiner*—Willis R Wolfe, Jr.
(74) *Attorney, Agent, or Firm*—Sughrue Mion, PLLC

(57) ABSTRACT

An internal combustion engine having a plurality of banks; each having a cylinder provided to said banks comprising: an intake valve provided between said cylinder and an intake manifold a camshaft opening and closing said intake valve by means of mechanical power of said internal combustion engine; and a changing unit changing, according to an operating state of said internal combustion engine a phase angle of said camshaft said phase angle corresponding to a closing timing of said intake valve said banks differing from each other in most retarded phase angle changed by said changing unit.

18 Claims, 9 Drawing Sheets

U.S. PATENT DOCUMENTS

| | | |
|---|---|---|
| 7,255,089 B2 * | 8/2007 | Etou et al. ............. 123/406.29 |
| 7,493,890 B2 * | 2/2009 | Etou et al. ............. 123/406.29 |
| 2002/0069638 A1 | 6/2002 | Glugla et al. |
| 2003/0221664 A1 | 12/2003 | Surnilla |
| 2004/0000282 A1 | 1/2004 | Kataoka et al. |
| 2004/0237514 A1 | 12/2004 | Surnilla et al. |

FOREIGN PATENT DOCUMENTS

| | | |
|---|---|---|
| JP | 05-195850 A | 8/1993 |
| JP | 06-193478 A | 7/1994 |
| JP | 06-323168 A | 11/1994 |
| JP | 11-141360 A | 5/1999 |
| JP | 2000-008892 A | 1/2000 |
| JP | 2000-064865 A | 2/2000 |
| JP | 2004-011644 A | 1/2004 |
| JP | 2004-027849 A | 1/2004 |

* cited by examiner

<LATER-CLOSED BANK> <EARLIER-CLOSED BANK>

USE WITH MOST RETARDED ANGLE OR ADVANCED ANGLE

DEACTIVATE BANK

SAME INTAKE VALVE CLOSING TIMING; USE AT PHASE ANGLE ACCORDING TO REQUEST

F I G. 8
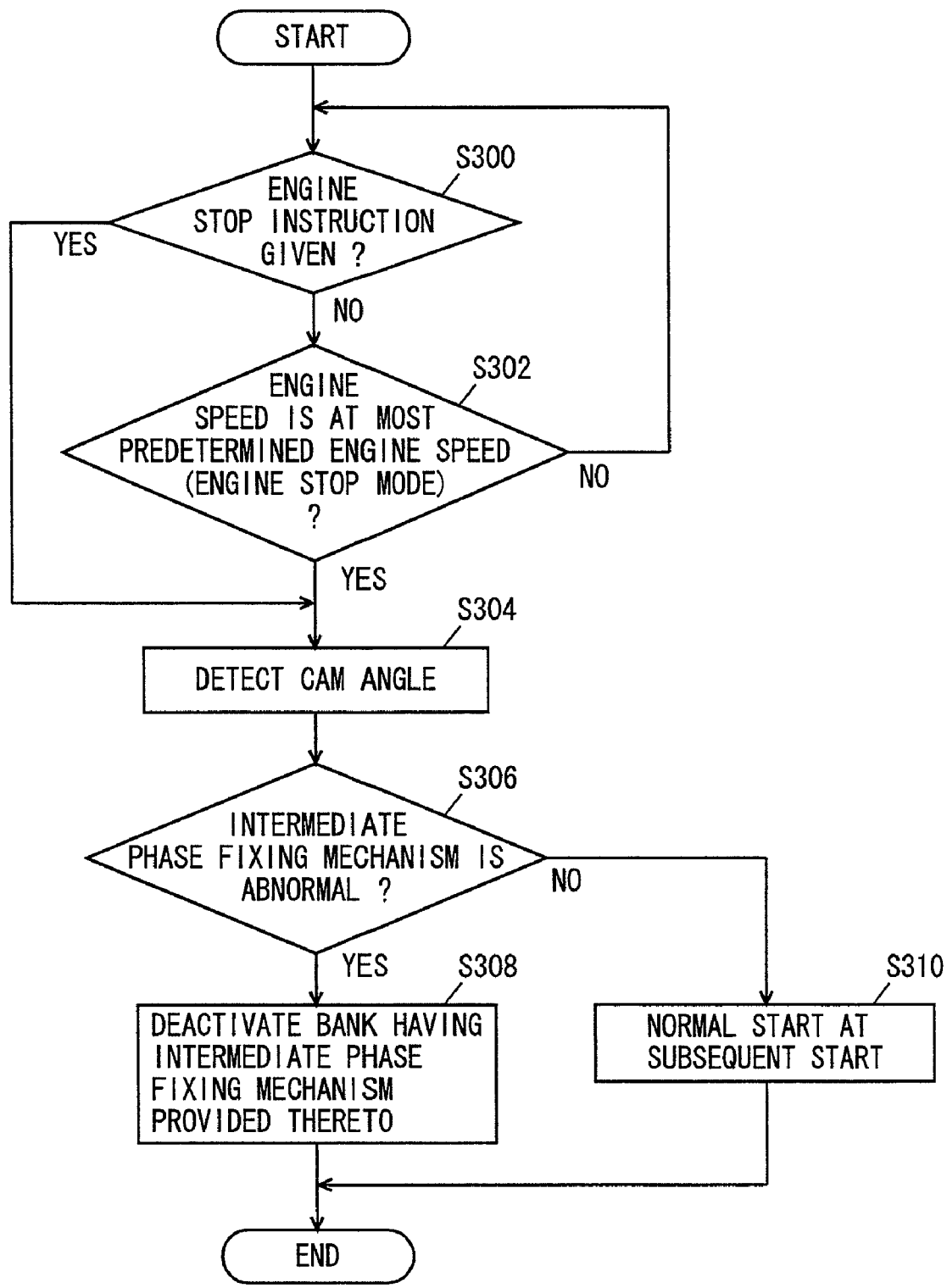

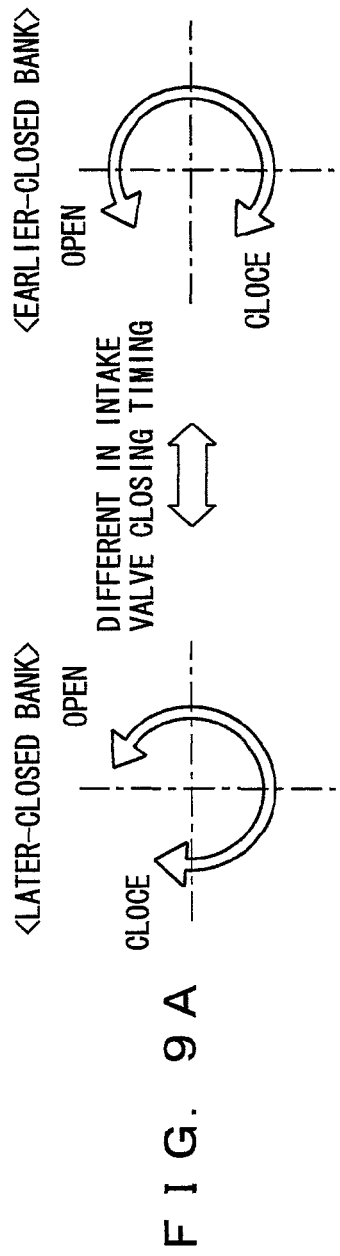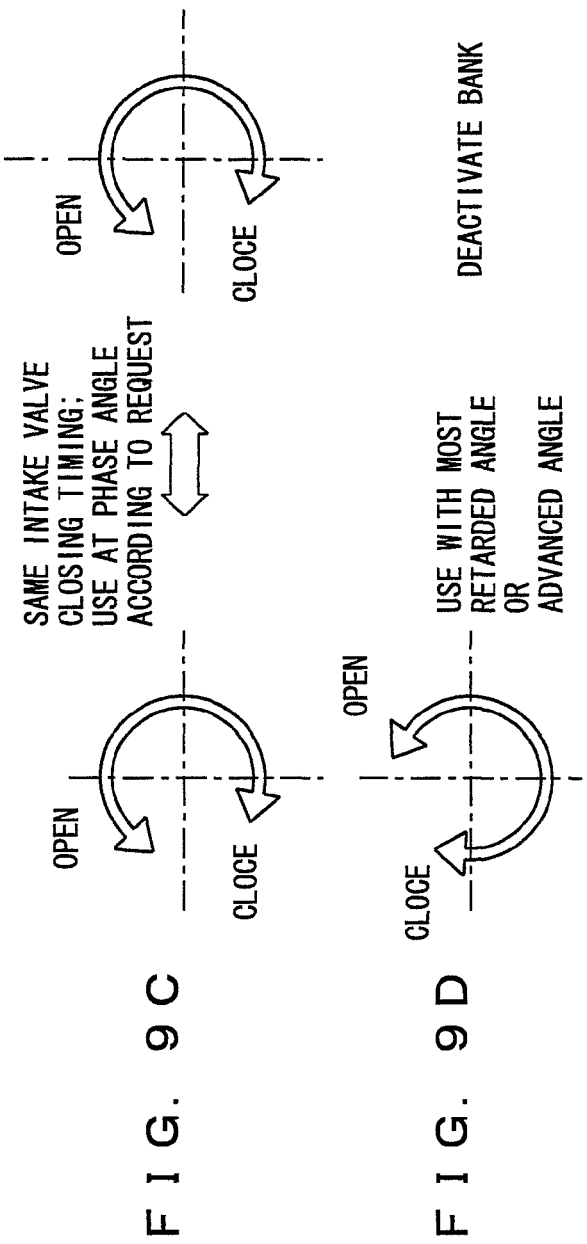
FIG. 9A
FIG. 9B
FIG. 9C
FIG. 9D

INTERNAL COMBUSTION ENGINE

TECHNICAL FIELD

The present invention relates to an internal combustion engine. In particular, the invention relates to an internal combustion engine having a plurality of banks that differ from each other in valve timing of a most retarded angle.

BACKGROUND ART

To an internal combustion engine mounted on a vehicle, a variable valve timing mechanism has conventionally been provided. The variable valve timing mechanism for example continuously and variably controls opening/closing timing of an intake valve by means of oil-hydraulic drive under electronic control so as to improve torque at low to medium speed, fuel economy and emission performance. The closing timing of the intake valve is set with higher priority given to startability when the internal combustion engine is started.

For example, Japanese Patent Laying-Open No. 06-323168 discloses a control apparatus for an internal combustion engine promoting atomization of injected fuel at the start of the internal combustion engine to improve startability without deterioration in emission. The control apparatus for the internal combustion engine includes: an intake valve and an exhaust valve provided in the internal combustion engine which converts reciprocating motion of a piston into rotary motion of a crankshaft to generate mechanical power, and driven by the rotation of the crankshaft to open and close an intake manifold and an exhaust manifold respectively that communicate with a combustion chamber of the internal combustion engine; a variable valve timing mechanism capable of adjusting the valve opening timing of at least the intake valve of the intake and exhaust valves; a fuel injection valve provided in the intake manifold for injecting fuel into the combustion chamber; starting state detection means for detecting the starting state of the internal combustion engine; first control means for controlling to drive the variable valve timing mechanism in the manner that, when the starting state detection means detects the starting state of the internal combustion engine, the exhaust valve is closed and the intake valve is opened after a piston reaches the top dead center, and the intake valve is closed later than a closing timing that is the closing timing after the engine is started; and second control means for controlling to drive the fuel injection valve in the manner that, when the starting state detection means detects the starting state of the internal combustion engine, the fuel is injected at the opening timing of the intake valve set by the variable valve timing mechanism.

Regarding the control apparatus for the internal combustion engine disclosed in the aforementioned document, the closing timing of the intake valve is retarded with respect to the closing timing after the start. Therefore, in the compression stroke where the piston is moved from the bottom dead center to the top dead center, the compression resistance to the piston decreases. With this decrease, the engine speed NE at the start (cranking) is readily increased so that the startability is improved.

The control apparatus for the internal combustion engine disclosed in the document retards the closing timing of the intake valve and thereby reduces the compression resistance so as to improve the startability of the internal combustion engine. However, in the case where higher priority is given to fuel economy and the valve closing timing is further retarded, a resultant problem is that an in-cylinder pressure with which the internal combustion engine can be started cannot be obtained.

It is necessary to set the intake-valve closing timing at the start of the internal combustion engine to a closing timing that does not deteriorate at least the startability at the start of the internal combustion engine. This is because the in-cylinder pressure (or compression ratio) obtained at ignition timing changes depending on the valve closing timing. Thus, in the case where higher priority is given to the startability of the internal combustion engine to set the valve closing timing, it could occur that the valve closing timing cannot be set with higher priority given to fuel economy since the variable range of the intake-valve closing timing is limited.

Further, in the case where higher priority is given to fuel economy to set the valve closing timing, the valve closing timing is further retarded so as to reduce the pumping loss. In this case, the in-cylinder pressure with which the internal combustion engine can be started could not be obtained so that the startability is deteriorated. A resultant problem is therefore that the ensured startability of the internal combustion engine and the improvement of fuel economy cannot be achieved simultaneously.

DISCLOSURE OF THE INVENTION

An object of the present invention is to provide an internal combustion engine that achieves both of ensured startability and improved fuel economy.

According to an aspect of the present invention, an internal combustion engine has a plurality of banks each having a cylinder provided to the banks. The internal combustion engine includes: an intake valve provided between the cylinder and an intake manifold; a camshaft opening and closing the intake valve by means of mechanical power of the internal combustion engine; and a changing unit changing, according to an operating state of the internal combustion engine, a phase angle of the camshaft, the phase angle corresponding to a closing timing of the intake valve. The banks differ from each other in most retarded phase angle changed by the changing unit.

According to the present invention, supposing, for example, that the phase angle of the camshaft is the most retarded phase angle at the start of the internal combustion engine, the most retarded phase angle of one bank is set to the one giving higher priority to startability and the most retarded phase angle of another bank is set to the one giving higher priority to improvement of fuel economy. Then, at engine start, the cylinder of the bank for which higher priority is given to startability is activated in order to obtain excellent startability. Further, while the internal combustion engine is being operated, switch is made to the bank for which higher priority is given to improvement of fuel economy in order to improve fuel economy. In other words, the banks have respective most retarded phase angles different from each other in that higher priority is given to startability for one bank while higher priority is given to improvement of fuel economy for another bank. Accordingly, both of ensured startability and improved fuel economy can be achieved. In this way, the internal combustion engine can be provided that achieves both of ensured startability and improved fuel economy.

Preferably, the changing unit includes a phase angle changing unit changing the phase angle to the most retarded phase angle when the internal combustion engine is stopped. The internal combustion engine further includes a control unit performing control in a manner that the cylinder of one bank of the plurality of banks is activated when the internal combustion engine is started, the one bank differing from a retard-angle-side bank that is another one of the plurality of banks and that has the most retarded phase angle retarded to a greater extent than the most retarded phase angle of the one bank.

According to the present invention, the phase angle of the intake camshaft is changed to the most retarded phase angle when the internal combustion engine is stopped. For one of a plurality of banks, which is different from a bank having the most retarded phase angle retarded to a greater extent, the phase angle is set to the one at which an in-cylinder pressure that can start the internal combustion engine can be obtained, giving higher priority to startability. Accordingly, when the internal combustion engine is started, excellent startability can be obtained. After the internal combustion engine is started, for example, switch may be made to the cylinder having the most retarded phase angle retarded to a greater extent so as to improve fuel economy. Thus, both of the ensured startability and the improved fuel economy can be achieved.

Still preferably, the internal combustion engine further includes an activation control unit performing control in a manner that the cylinder of the retard-angle-side bank is activated after the cylinder of that one bank is activated.

According to the present invention, control is performed in the manner that the cylinder of the retard-angle-side bank is activated after the cylinder of that one bank different from the retard-angle-side bank is activated. Thus, the internal combustion engine is operated with all cylinders so that output requested to the vehicle can immediately be generated.

Still preferably, the internal combustion engine further includes a deactivation control unit performing control in a manner that the cylinder of that one bank is deactivated after the cylinder of the retard-angle-side bank is activated.

According to the present invention, control is performed in the manner that the cylinder of the bank different from the retard-angle-side bank is deactivated after the cylinder of the retard-angle-side bank is activated, so that the internal combustion engine is operated with the cylinder of the retard-angle-side bank. Thus, reduced-cylinder operation improves fuel economy and further, the closing timing of the intake valve of the retard-angle-side bank can be retarded relative to the bank different from the retard-angle-side bank. Accordingly, actual compression ratio is lowered, pumping loss is reduced and fuel economy is improved.

Still preferably, one bank of a plurality of banks has the most retarded phase angle that is a phase angle at which an in-cylinder pressure that can start the internal combustion engine is obtained, the one bank differing from a retard-angle-side bank that is another one of the plurality of banks and that has the most retarded phase angle retarded to a greater extent than the most retarded phase angle of that one bank.

According to the present invention, the most retarded phase angle of the bank different from the retard-angle-side bank is the phase angle at which an in-cylinder pressure that can start the internal combustion engine can be obtained. Thus, when the internal combustion engine is started, the cylinder of the bank different from the retard-angle-side bank can be started to achieve excellent startability.

Still preferably, the internal combustion engine further includes a limiting unit provided to a retard-angle-side bank that is included in a plurality of banks and that has the most retarded phase angle retarded to a greater extent relative to another bank included in the plurality of banks, the limiting unit limiting the phase angle to a predetermined phase angle when the internal combustion engine is stopped.

According to the present invention, the limiting unit is provided to the retard-angle-side bank that is one of a plurality of banks and that has the most retarded phase angle retarded to a greater extent relative to other banks. The limiting unit limits the phase angle to a predetermined phase angle (for example, phase angle at which an in-cylinder pressure that can start the engine can be obtained) when the internal combustion engine is stopped. By limiting, when the internal combustion engine is stopped, the phase angle of the camshaft of the retard-angle-side bank to the phase angle at which the in-cylinder pressure that can start the internal combustion engine can be obtained, excellent startability can be obtained at the start of the internal combustion engine. Further, while the internal combustion engine is operated, the predetermined phase angle is changed to a more retarded phase angle so that the closing timing of the intake valve can be retarded relative to the one at the engine start. Accordingly, actual compression ratio is lowered, pumping loss is reduced and fuel economy is improved.

Still preferably, the predetermined phase angle is a phase angle at which an in-cylinder pressure that can start the internal combustion engine is obtained.

According to the present invention, the predetermined phase angle is a phase angle at which the in-cylinder pressure that can start the internal combustion engine can be obtained. Since the limiting unit limits the phase angle to a predetermined phase angle when the engine is stopped, excellent startability can be obtained when the internal combustion engine is started. Further, while the internal combustion engine is operated, the phase angle is further changed from the predetermined phase angle to a more retarded phase angle. Thus, the closing timing of the intake valve can be retarded relative to the one at the start. Accordingly, actual compression ratio is lowered, pumping loss is reduced and fuel economy is improved.

Still preferably, the internal combustion engine further includes a cylinder control unit performing control in a manner that the cylinder of one bank differing from the retard-angle-side bank is deactivated after the internal combustion engine is started.

According to the present invention, the cylinder control unit performs control in the manner that, after the internal combustion engine is started, the cylinder of the bank different from retard-angle-side bank is deactivated. Thus, the reduced-cylinder operation improves fuel economy. Further, in the retard-angle-side bank, the closing timing of the intake valve can be retarded relative to the bank different from the retard-angle-side bank. Accordingly, actual compression ration is lowered, pumping loss is reduced and fuel economy is improved.

Still preferably, the internal combustion engine further includes: a determination unit determining whether the phase angle is limited to the predetermined phase angle when the internal combustion engine is stopped; and a cylinder deactivation control unit performing control in a manner that, when it is determined that the phase angle is not limited to the predetermined phase angle, the cylinder of the bank with the limiting unit provided thereto is deactivated when the internal combustion engine is started.

According to the present invention, the cylinder deactivation control unit performs control in the manner that, when it is deter mined that the phase angle is not limited to the predetermined phase angle, the cylinder of the bank to which the limiting unit is provided is deactivated when the internal combustion engine is started. If the phase angle is not limited to the predetermined phase angle, it is likely that the phase angle of the camshaft is not the phase angle at which the in-cylinder pressure that can start the internal combustion engine can be obtained. Therefore, control is performed to deactivate the cylinder of the bank having the limiting unit provided thereto while the cylinder of the bank (different from the bank to which the limiting unit is provided) for which startability is ensured is used to start the engine, so that excellent startability can be achieved.

BRIEF DESCRIPTION OF THE DRAWINGS

FIG. 8 is a flowchart showing a control structure of a program for starting with one bank when an abnormal state of an intermediate phase fixing mechanism occurs.

FIGS. 9A to 9D are each a diagram (No. 3) showing respective closing timings of intake valves in left and right banks.

BEST MODES FOR CARRYING OUT THE INVENTION

Figure 1:
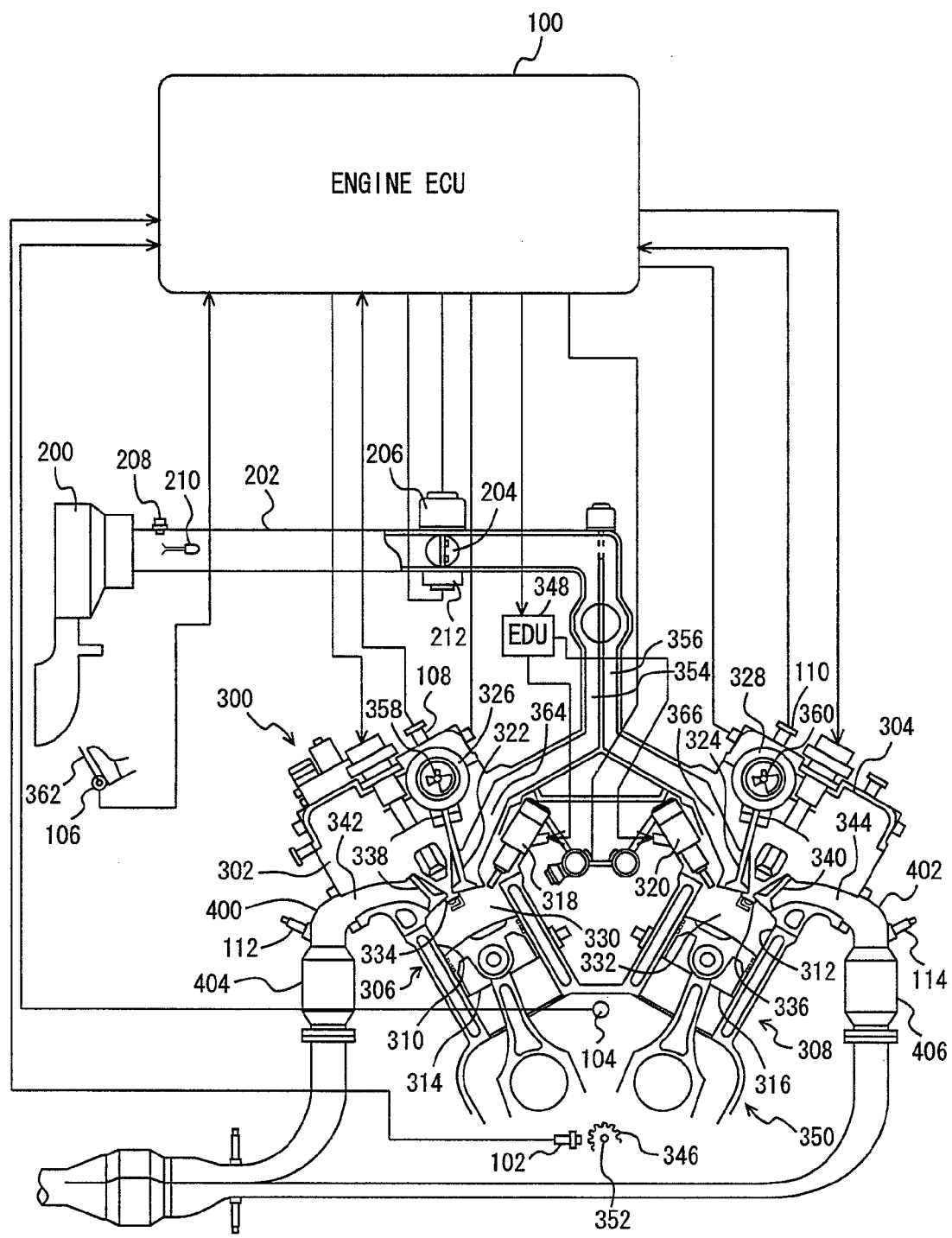
FIG. 1 shows a configuration of an internal combustion engine according to a first embodiment of the present invention.

With reference to the drawings, embodiments of the present invention are hereinafter described. In the following description, the same components are denoted by the same reference characters. They are named identically and they function identically. Therefore, a detailed description thereof is not repeated.

First Embodiment

As shown in FIG. 1, a V-6 engine 300 serving as an internal combustion engine mounted on a vehicle includes a cylinder block 350 having a plurality of cylinders arranged in the shape of V as seen in the direction orthogonal to the plane of the drawing, and a left cylinder head 302 and a right cylinder head 304 each coupled to the top of cylinder block 350. Thus a left group of cylinders 306 and a right group of cylinders 308 are formed. The cylinder groups are each referred to as bank hereinafter. In connection with the present embodiment, although engine 300 is described as a V-6 direct-injection gasoline engine, it is not particularly limited to the engine of this type. As long as the engine has a plurality of banks, the present invention may be applied to horizontally opposed engine or W-engine. Further, the engine here is not limited to the 6-cylinder engine and it may be 4-cylinder or 8-cylinder engine. Furthermore, the present invention may be applied to an engine of the port-fuel-injection type, instead of an engine of the in-cylinder fuel injection (direct injection) type.

To an intake side of an intake manifold 202, an air cleaner 200 is connected. At some point of intake manifold 202, a throttle valve 204 is disposed that is driven to open/close in accordance with the degree to which an accelerator pedal 362 is operated. The degree to which accelerator pedal 362 is operated is detected by a pedal position sensor 106. Pedal position sensor 106 transmits to an engine ECU (Electronic Control Unit) 100 a signal indicating the degree to which accelerator pedal 362 is operated.

In accordance with the operation of accelerator pedal 362, throttle valve 204 is opened/closed to adjust the quantity of intake air. To intake manifold 202, an airflow meter 210 and an intake air temperature sensor 208 are provided. Airflow meter 210 transmits to engine ECU 100 a signal indicating the quantity of intake air. Intake air temperature sensor 208 transmits to engine ECU 100 a signal indicating the temperature of intake air.

In the vicinity of throttle valve 204, a throttle motor 206 opening/closing throttle valve 204 and a throttle position sensor 212 detecting the throttle opening position TA are provided. Based on the detected throttle opening position TA, engine ECU 100 controls drive of throttle motor 206 so that a requested throttle opening position is reached. Further, on the downstream side of throttle valve 204, intake manifold 202 branches to connect to intake manifolds 354, 356.

Engine 300 includes pistons 314, 316 reciprocating to move substantially in the up-and-down direction within respective cylinders 310, 312 of cylinder block 350. To lower end portions of pistons 314, 316, a crankshaft 352 is coupled. As pistons 314, 316 are each moved up and down, crankshaft 352 is rotated.

Further, in the vicinity of crankshaft 352, a crank position sensor 102 is provided. Crank position sensor 102 is comprised of a rotor 346 coupled to crankshaft 352 and having a plurality of teeth and an electromagnetic pickup provided to face rotor 346. Every time a tooth of rotor 346 passes in front of the electromagnetic pickup, a pulse-shaped crank angle signal is generated. Crank position sensor 102 transmits the generated crank angle signal to engine ECU 100. The number of times the crank angle signal from crank position sensor 102 is generated is measured to calculate the rotational speed (engine speed) of crankshaft 352 in engine ECU 100. Further, rotor 346 has a tooth-missing portion. Using a crank angle signal corresponding to the tooth-missing portion as a reference, engine ECU 100 detects the rotational angle of crankshaft 352.

Spaces defined by cylinder block 350, respective inner walls of cylinder heads 302, 304 and respective tops of pistons 314, 316 serve as combustion chambers 330, 332 for burning air-fuel mixture. At respective tops of cylinder heads 302, 304, spark plugs 334, 336 for igniting air-fuel mixture are disposed to protrude in combustion chambers 330, 332.

At respective tops of cylinders of cylinder heads 302, 304 of engine 300, injectors 318, 320 for directly supplying fuel into combustion chambers 330, 332 are disposed. Injectors 318, 320 are each a solenoid valve that is electrically energized to open. To injectors 318, 320 each, fuel is supplied that is delivered to a high pressure fuel pump (not shown). Injectors 318, 320 are connected to an EDU (Electronic Driver Unit) 348. EDU 348 operates high-pressure injectors 318, 320 at high speed. EDU 348 drives injectors 318, 320 based on a control signal received from engine ECU 100.

Thus, while engine 300 is operated, air filtered by air cleaner 200 is taken in intake manifold 202 and, as the air is taken in combustion chamber 330, 332, fuel is injected from injectors 318, 320 toward respective combustion chambers 330, 332. Consequently, air-fuel mixture is generated in combustion chambers 330, 332, ignited by ignition plugs 334, 336 and burned. Exhaust gas generated by the combustion in combustion chambers 330, 332 is discharged to the atmosphere through catalytic converters 404, 406 disposed at exhaust manifolds 400, 402.

Further, at cylinder block 350, a coolant temperature sensor 104 is disposed for detecting the temperature of coolant (coolant temperature) THW flowing through a coolant passage. Further, cylinder heads 302, 304 have respective intake ports 364, 366 and exhaust ports 342, 344. To intake ports 346, 366, intake manifolds 354, 356 are connected respectively. To exhaust ports 342, 344, exhaust manifolds 400, 402 are connected respectively. Furthermore, between respective intake ports 364, 366 of cylinder heads 302, 304 and combustion chambers 330, 332, intake valves 322, 324 are provided respectively. Between exhaust ports 342, 344 and combustion chambers 330, 332, exhaust valves 338, 340 are provided respectively.

Above intake valve 322 of left bank 306, a left intake camshaft 358 for driving to open/close intake valve 322 is provided. Above intake valve 324 of right bank 308, a right intake camshaft 360 for driving to open/close intake valve 324 is provided. Further, above exhaust valve 338 of left bank 306, a left exhaust camshaft (not shown) for driving to open/close exhaust valve 338 is provided. Above exhaust valve 340 of right bank 308, a right exhaust camshaft (not shown) for driving to open/close exhaust valve 340 is provided.

Further, to intake camshafts 358, 360, intake timing pulleys (not shown) are mounted respectively. To one end of exhaust camshafts (not shown) each, an exhaust timing pulley (not shown) is mounted. Each timing pulley is coupled via a timing belt (not shown) to crankshaft 352.

Thus, while engine 300 is operated, rotational drive force is transmitted from crankshaft 352 via the timing belt and each timing pulley to intake camshafts 358, 360 and exhaust camshafts each. Intake camshafts 358, 360 and exhaust camshafts are each rotated to drive to open/close intake valves 322, 324 and exhaust valves 338, 340 each. These valves 322, 324, 338, 340 are each driven at a predetermined opening/closing timing in synchronization with rotation of crankshaft 352 and up-and-down movement of pistons 314, 316, namely in synchronization with a series of four strokes of engine 300 that are intake stroke, compression stroke, combustion and expansion stroke, and exhaust stroke.

Further, in the vicinity of intake camshafts 358, 340, cam angle sensors 108, 110 are provided respectively. Cam angle sensors 108, 110 are each comprised of a magnetic rotor (not shown) coupled to intake camshafts 358, 360 and an electromagnetic pickup (not shown). On the outer periphery of the magnetic rotor, a plurality of teeth are formed at even angles. For example, in the range of 90° to 30° of BTDC (Before Top Dead Center) namely before compression TDC (Top Dead Center) of a predetermined cylinder, a pulse-shaped cam angle signal (displacement timing signal) according to rotation of intake camshafts 358, 360 is detected. Cam angle sensors 108, 110 each transmit a detected cam angle signal to engine ECU 100.

In addition, in engine 300 serving as the internal combustion engine in the present embodiment, oil-hydraulically-driven variable valve timing mechanisms 326, 328 (the variable valve timing mechanism is hereinafter also referred to as "VVT") are disposed at respective intake timing pulleys of left bank 306 and right bank 308, in order to change the valve overlap period by changing opening/closing timing of intake valves 322, 324. VVT 326, 328 are each a mechanism changing the phase angle of intake camshafts 358, 360 with respect to rotation of crankshaft 352 (intake timing pulley) for continuously (steplessly) changing the valve timing of intake valves 322, 324.

To VVT 326, 328 respectively, associated oil control valves (not shown) (hereinafter referred to as "OCV"), oil pumps (not shown) and oil filters (not shown) are connected. In the present embodiment, an actuator of VVT 326, 328 is comprised of the OCV and oil pump for example.

VVT 326, 328 have a vane-type actuator for example. Vane-type VVT 326, 328 are comprised of a vane portion (not shown) fixed to intake camshafts 358, 360 and oil-hydraulic chambers (advance angle chamber and retard angle chamber) provided on respective opposing sides of the vane portion. As the oil pressure in the advance angle chamber increases, the vane portion is moved so that intake camshafts 358, 360 are rotated in the direction of the advance angle, according to the increase in oil pressure of the advance angle chamber. As the oil pressure in the retard angle chamber increases, the vane portion is moved so that intake camshafts 358, 360 are rotated in the direction of the retard angle.

Engine ECU 100 transmits a duty control signal to the OCV. The OCV increases the oil pressure in the advance angle chamber (decreases the oil pressure in the retard angle chamber) or increases the oil pressure in the retard angle chamber (decreases the oil pressure in the advance angle chamber) based on the duty control signal as received. Thus, the phase angle of intake camshafts 358, 360 is controlled.

To VVT 326, 328, a lock pin (not shown) is provided that limits, in the case where the oil pressure decreases and thus no oil pressure is exerted when engine 300 is stopped, the phase angle of intake camshafts 358, 360 to a phase angle at a most retarded timing (hereinafter referred to as "most retarded phase angle"). When the oil pressure increases at the start of engine 300, the lock pin is disengaged.

Regarding a vehicle on which engine 300 as described above is mounted, the present invention has a feature that left and right banks 306, 308 differ from each other in most retarded phase angle of intake camshafts 358, 360 in left and right banks 306, 308.

In the internal combustion engine according to the present embodiment, in the state where no oil pressure is exerted when engine 300 is stopped, the phase angle of intake camshafts 358, 360 is limited by the lock pin to the most retarded phase angle. Thus, at the start of engine 300, intake camshafts 358, 360 in left and right banks 306, 308 differ from each other in phase angle.

In the present embodiment, engine ECU 100 controls engine 300 in the manner that, at the start of engine 300, the cylinder of one of left and right banks 306, 308 is activated. Specifically, the one bank differs from the other of the left and right banks in that the most retarded phase angle of the other bank is retarded to a greater extent than the most retarded phase angle of the aforementioned one bank. For example, it is supposed that the most retarded phase angle of intake camshaft 358 provided in left bank 306 is more retarded than that of right bank 308. Then, at the start of engine 300, engine 300 is controlled in the manner that engine 300 is started with only the cylinder of right bank 308 while the cylinder of left bank 306 is deactivated.

Figure 2:
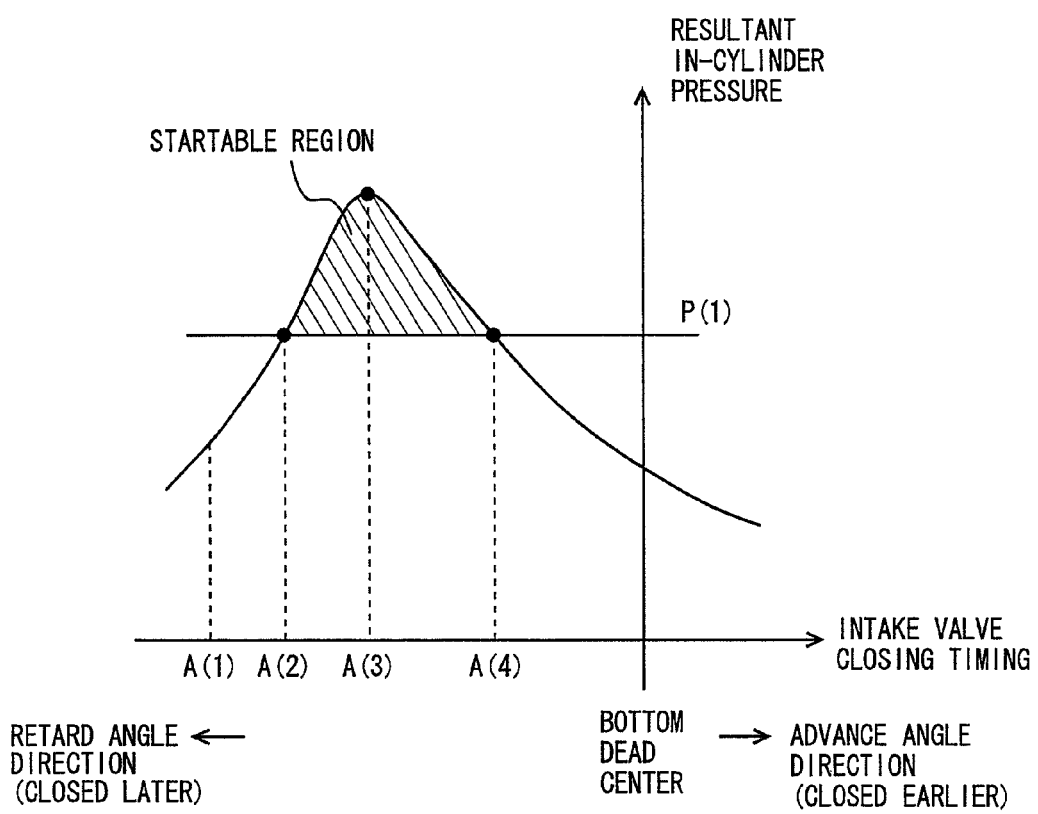
FIG. 2 shows a relation between an in-cylinder pressure and a closing timing of an intake valve.

A relation between the closing timing of the intake valve and the in-cylinder pressure resultant from the charging efficiency has, as shown in FIG. 2, a maximum value at the closing timing A (3) that is the closing timing retarded (in the retard angle direction of the intake camshaft) with respect to the bottom dead center. The left side of the horizontal axis in FIG. 2 represents later-closed timing of the intake valve, and the right side thereof represents earlier-closed timing thereof. Specifically, at the start of engine 300, in the case where the closing timing of the intake valve is A (3), the resultant in-cylinder pressure is the maximum pressure and thus the compression ration is high, and accordingly the startability is excellent. Further, when the engine is to be started, the closing timing at which an in-cylinder pressure of at least P (1) that can start engine 300 can be obtained is A (2) to A (4). Therefore, the most retarded phase angle of intake camshaft 360 of right bank 308 that is started to operate at the start of engine 300 is set so that the closing timing of intake valve 324 is in the range of A (2) to A (4).

In the present embodiment, the closing timing of intake valve 324 is not limited to a particular timing as long as the timing is in the range of A (1) to A (4). The timing is adapted for example in terms of startability at the start and, fuel economy or emission based on the variable range of the valve timing after the start.

In contrast, since the cylinder of left bank 306 is activated while engine 300 is operated, this cylinder can be activated even if the in-cylinder pressure equal to or higher than P (1) cannot be obtained. Therefore, regarding the closing timing of intake valve 322 of left bank 306, higher priority is given to improvement in fuel economy, the timing is set to A (1) that is retarded to a greater extent than A (2). The closing timing of intake valves 322, 324 corresponds to the phase angle of intake camshafts 358, 360. The phase angle is calculated based on the rotational angle of intake camshafts 358, 360 detected by cam angle sensors 108, 110 and the rotational angle of crankshaft 352 detected by crank position sensor 102. Closing timing A (1) of intake valve 322 is not particularly limited, and the closing timing may be any as long as the closing timing is retarded to a greater extent than A (2).

Engine ECU 100 controls engine 300 in the manner that the engine is started by means of one of the banks (hereinafter also referred to as one bank) if the operating state of engine 300 does not satisfy a predetermined start condition and, if it satisfies the predetermined start condition, the deactivated cylinder in the bank is activated so that both banks are used for driving the vehicle (hereinafter also referred to as "all-cylinder operation"). Specifically, in the present embodiment, at the start of engine 300, engine ECU 100 starts engine 300 using a cylinder of the bank (right bank 308) different from the bank having the most retarded phase angle retarded to a greater extent. After the start, on the condition that a predetermined start condition is satisfied, engine ECU 100 activates the deactivated cylinder in the bank (left bank 306). It is noted that "the cylinder is deactivated" refers to the fuel-cut state. Preferably, while the cylinder is deactivated, both of the intake valve and the exhaust valve are closed. In this way, pumping loss can be reduced.

Figure 3:
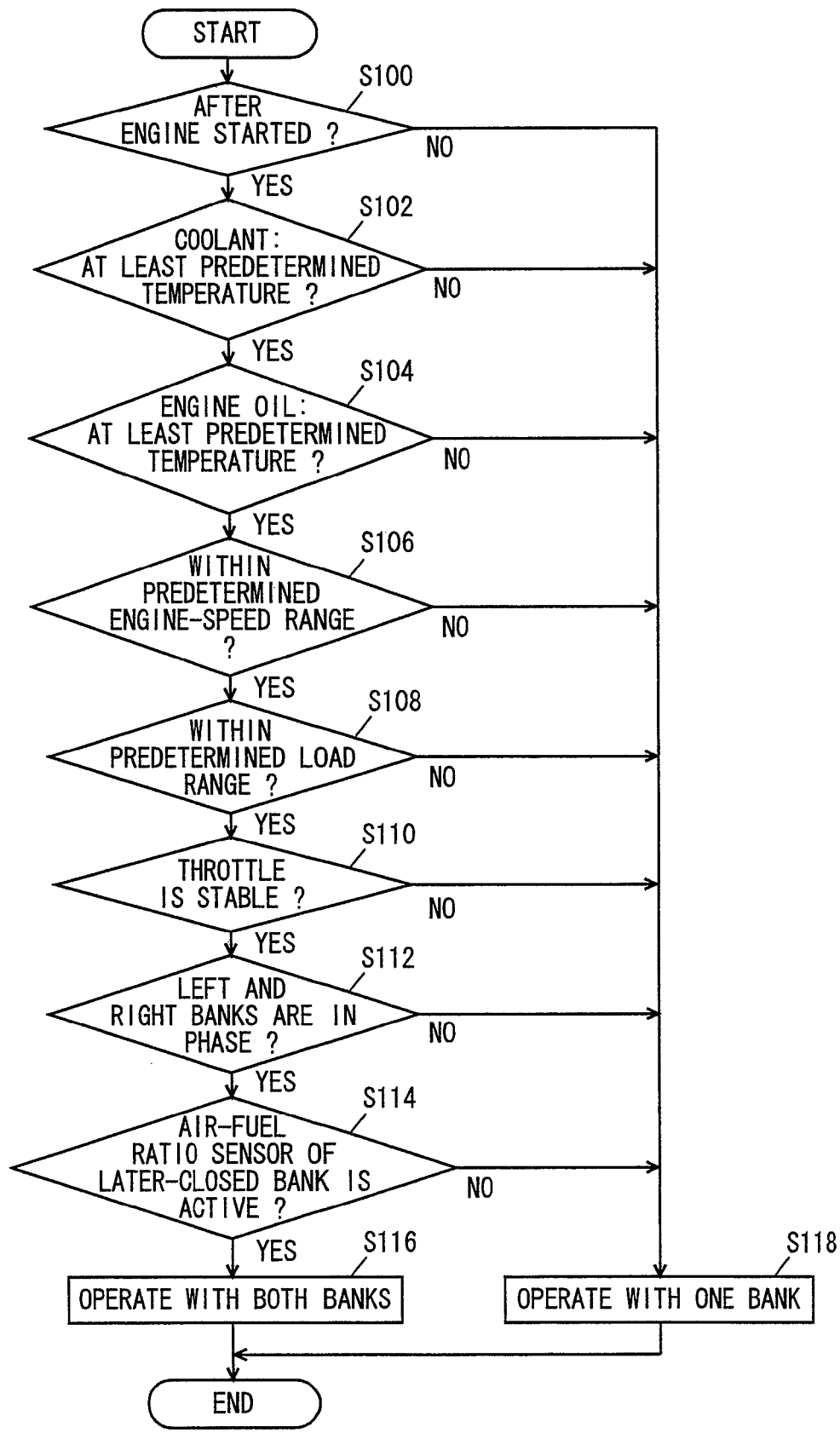
FIG. 3 is a flowchart (No. 1) showing a control structure of a program for making a switch between one-bank operation and all-cylinder operation.

In the following, with reference to FIG. 3, a description is given of a control structure of a program executed by engine ECU 100 controlling engine 300 serving as the internal combustion engine according to the present embodiment. According to the program, engine 300 is started with one bank and all-cylinder operation is performed when a predetermined condition is satisfied after the start.

In step (hereinafter step is abbreviated as S) 100, engine ECU 100 determines whether or not it is after engine 300 is started. When it is after engine 300 is started (YES in S100), the process proceeds to S102. Otherwise (NO in S100), the process proceeds to S118.

In S102, engine ECU 100 determines whether or not the temperature of coolant of engine 300 that is detected by coolant temperature sensor 104 is equal to or higher than a predetermined temperature. The predetermined temperature is not limited to a particular temperature and is for example a value adapted by experiment for example. When the coolant temperature is equal to or higher than the predetermined temperature (YES in S102), the process proceeds to S104. Otherwise (NO in S102), the process proceeds to S118.

In S104, engine ECU 100 determines whether or not the temperature of engine oil of engine 300 that is detected by an oil temperature sensor (not shown) is equal to or higher than a predetermined temperature. The predetermined temperature is not limited to a particular temperature and is a value adapted by experiment for example. When the engine-oil temperature is equal to or higher than the predetermined temperature (YES in S104), the process proceeds to S106. Otherwise (NO in S104), the process proceeds to S118.

In S106, engine ECU 100 determines whether or not the engine speed of engine 300 is within a predetermined range. In the present embodiment, the engine speed of engine 300 is detected by crank position sensor 102. The predetermined range is not limited to a particular range and is a range of the engine speed adapted by experiment for example. When the engine speed is in the predetermined range (YES in S106), the process proceeds to S108. Otherwise (NO in S106), the process proceeds to S118.

In S108, engine ECU 100 determines whether or not load of engine 300 is in a predetermined load range. The load of engine 300 is, for example, a requested torque that is requested by a driver and is based on the degree to which accelerator pedal 362 is operated that is detected by pedal position sensor 106. The load of engine 300 may be a requested torque that is requested to the vehicle while the vehicle is cruising. The predetermined range is not limited to a particular range and is a range adapted by experiment for example. When the load is in the predetermined range (YES in S108), the process proceeds to S110. Otherwise (NO in S108), the process proceeds to S118.

In S110, engine ECU 100 determines whether or not the throttle is stable. Specifically, engine ECU 100 determines whether or not the degree of change of the opening position of throttle valve 204 that is detected by throttle position sensor 212 is equal to or less than a predetermined degree of change and is in a substantially constant state. When it is determined that the throttle is stable (YES in S110), the process proceeds to S112. Otherwise (NO in S110), the process proceeds to S118.

In S112, engine ECU 100 determines whether or not respective phase angles of intake camshafts 358, 360 of left and right banks 306, 308 are substantially in phase. Engine ECU 100 determines, based on the rotational angle of crankshaft 352 that is detected by crank position sensor 102 and the rotational angle of intake camshafts 358, 360 detected by cam angle sensors 108, 110, whether or not respective phase angles of intake camshafts 358, 360 are substantially in phase. When respective phase angles of intake camshafts 358, 360 are substantially in phase (YES in S112), the process proceeds to S114. Otherwise, the process proceeds to S118.

In S114, engine ECU 100 determines whether or not an air-fuel ratio sensor 112 of left bank 306 is activated. Engine ECU 100 determines, depending on whether a time necessary for activation of air-fuel ratio sensor 112 has passed since the start of engine 300, whether or not air-fuel ratio sensor 112 is activated. When air-fuel ratio sensor 112 is activated (YES in S114), the process proceeds to S116. Otherwise (NO in S114), the process proceeds to S118.

In S116, engine ECU 100 controls engine 300 so that all-cylinder operation with left and right banks 306, 308 is performed. Specifically, when the cylinder of left bank 306 is deactivated, engine ECU 100 controls engine 300 so that the cylinder of left bank 306 is activated. Namely, engine ECU 100 controls injector 318 so that fuel is injected into combustion chamber 330 of left bank 306.

In S118, engine ECU 100 operates engine 300 with only the cylinder of one bank. Namely, at the start of engine 300, engine ECU 100 controls injectors 318, 320 so that fuel is not supplied to the cylinder of left bank 306 while fuel is supplied to the cylinder of right bank 308, for starting engine 300 with only the combustion pressure in the cylinder of right bank 308.

Figure 4A:
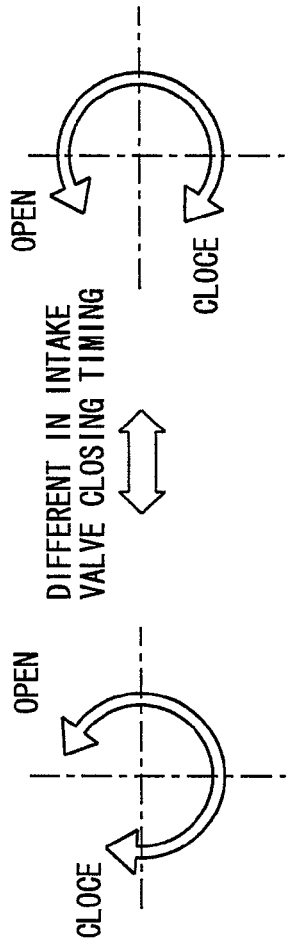
FIGS. 4A to 4C are each a diagram (No. 1) showing respective closing timings of intake valves in left and right banks.
Figure 4B:
Figure 4C:
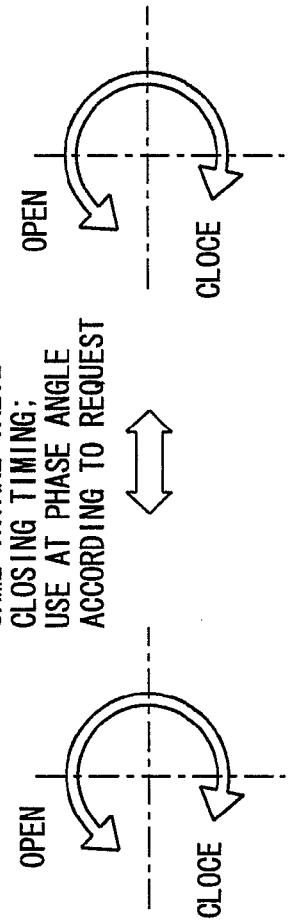

With reference to FIGS. 4A to 4C, a description is given of an operation of engine ECU 100 controlling engine 300 serving as the internal combustion engine in the present embodiment, based on the above-described structure and flowchart.

Respective opening/closing timings of intake valves 322, 324 before start of engine 300 are limited each to the most retarded timing. In FIGS. 4A to 4C, "later-closed bank" is left bank 306 and "earlier-closed bank" is right bank 308. Thus, before the start of engine 300, intake valve 322 and intake valve 324 differ in closing timing.

At the start of engine 300 (NO in S100), as shown in FIG. 4B, engine 300 is started with the cylinder of one of left and right banks that is not the bank in which the most retarded phase angle is retarded to a greater extent, namely engine 300 is started using the cylinder of right bank 308 (S118).

After the start of engine 300 (YES in S100), under the conditions that the coolant temperature and the engine-oil temperature are equal to or higher than respective predetermined temperatures (YES in S102 and YES in S104) and the engine speed and load are in respective predetermined ranges (YES in S106 and YES in S108), it is determined whether or not the throttle is stable (S110). After engine 300 is started, engine ECU 100 controls the engine so that respective phase angles of intake camshafts 358, 360 are substantially in phase. Thus, under the conditions that the throttle is stable (YES in S110), respective phase angles of intake camshafts 358, 360 are substantially in phase as shown in FIG. 4C (YES in S112) and the time for activation of air-fuel ratio sensor 112 of left bank 306 has passed (YES in S114), the all-cylinder operation with left and right banks 306, 308 is performed (S116). When the operating state of engine 300 does not satisfy any of the above-described conditions (NO in any of S100 to S114), the operation of engine 300 is continued with only the cylinder of right bank 308 (S118).

Further, engine ECU 100 controls engine 300 in the manner that the cylinder of the bank (right bank 308), which is different from the bank having the most retarded phase angle that is a phase angle retarded to a relatively greater extent, is deactivated, when a predetermined stop condition is satisfied after the start of engine 300 and during the all-cylinder operation (operation by means of the combustion pressure in cylinders of left and right banks 306, 308).

Figure 5:
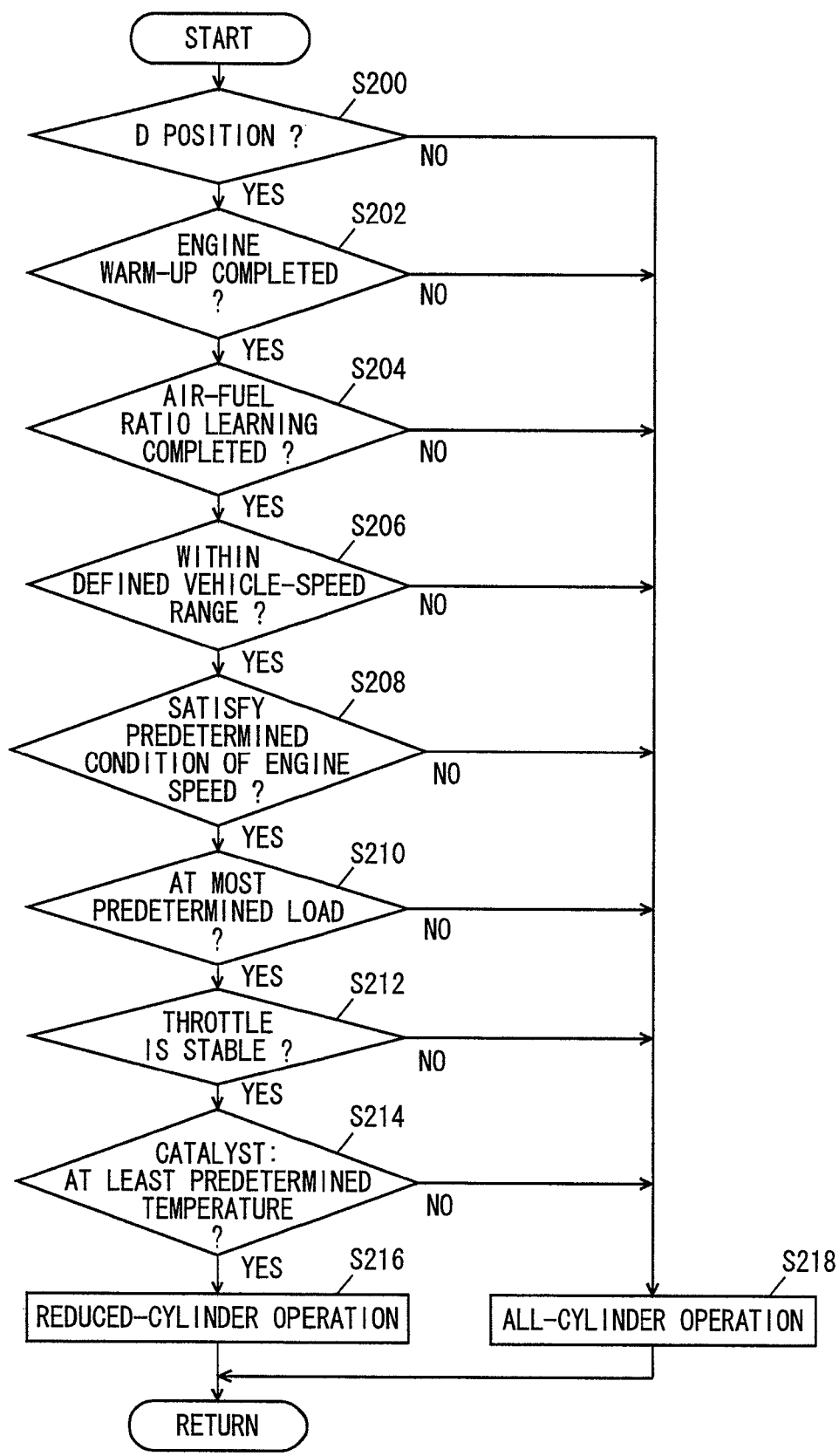
FIG. 5 is a flowchart (No. 2) showing a control structure of a program for making a switch between one-bank operation and all-cylinder operation.

In the following, with reference to FIG. 5, a description is given of a control structure of a program executed by engine ECU 100 controlling engine 300 serving as the internal combustion engine according to the present embodiment. According to the program, control for reduced-cylinder operation is performed when the operating state of engine 300 satisfies a predetermined stop condition during the all-cylinder operation.

In S200, engine ECU 100 determines whether or not the shift position is the forward drive (D) position. Engine ECU 100 determines, based on for example a signal indicating the shift position that is received from an ECT (Electronically Controlled Automatic Transmission)_ ECU (not shown), whether or not the shift position is the D position. When the shift position is the D position (YES in S200), the process proceeds to S202. Otherwise (NO in S200), the process proceeds to S218.

In S202, engine ECU 100 determines whether or not warm-up of engine 300 is completed. Engine ECU 100 determines that warm-up of engine 300 is completed when the coolant temperature of engine 300 that is detected by coolant temperature sensor 104 is equal to or higher than a predetermined temperature. When warm-up of engine 300 is completed (YES in S202), the process proceeds to S204. Otherwise (NO in S202), the process proceeds to S218.

In S204, engine ECU 100 determines whether or not learning of the air-fuel ratio is completed. Engine ECU 100 determines that learning is completed when, for example, the air-fuel ratio detected by air-fuel ratio sensor 114 is substantially equal to a target value. When learning of the air-fuel ratio is completed (YES in S204), the process proceeds to S206. Otherwise (NO in S204), the process proceeds to S218.

In S206, engine ECU 100 determines whether or not the vehicle speed is a speed within a predetermined range. Engine ECU 100 may detect the vehicle speed based on, for example, a signal indicating the wheel speed that is received from a wheel speed sensor (not shown) provided to each wheel. The predetermined range is not limited to a particular range and is adapted by experiment for example. When the vehicle speed is in the predetermined range (YES in S206), the process proceeds to S208. Otherwise (NO in S206), the process proceeds to S218.

In S208, engine ECU 100 determines whether or not the engine speed of engine 300 satisfies a predetermined condition of the engine speed. For example, engine ECU 100 determines whether or not the engine speed of engine 300 is a speed in a predetermined range. The predetermined range is not limited to a particular range and is adapted by experiment for example. When the engine speed of engine 300 satisfies the predetermined condition of the engine speed (YES in S208), the process proceeds to S210. Otherwise (NO in S208), the process proceeds to S218.

In S210, engine ECU 100 determines whether or not load of engine 300 is a load in a predetermined range. The predetermined range is not limited to a particular range and is adapted by experiment for example. When the load of engine 300 is a load in the predetermined range (YES in S210), the process proceeds to S212. Otherwise (NO in S210), the process proceeds to S218.

In S212, engine ECU 100 determines whether or not the throttle is stable. When the throttle is stable (YES in S212), the process proceeds to S214. Otherwise (NO in S212), the process proceeds to S218.

In S214, engine ECU 100 determines whether or not the catalyst temperature is equal to or higher than a predetermined temperature. Engine ECU 100 determines whether or not the catalyst temperature that is detected by a catalyst temperature sensor (not shown) provided to a catalyst 406 is equal to or higher than the predetermined temperature. The predetermined temperature is not limited to a particular temperature and is adapted by experiment for example. When the catalyst temperature is equal to or higher than the predetermined temperature (YES in S214), the process proceeds to S216. Otherwise (NO in S214), the process proceeds to S218.

In S216, engine ECU 100 controls engine 300 so that the reduced-cylinder operation is performed. Specifically, engine ECU 100 controls engine 300 in the manner that the cylinder of right bank 308 is deactivated that is one of left and right banks 306, 308 and that differs from left bank 306 in which the most retarded phase angle is a phase angle retarded to a relatively greater extent. In S218, engine ECU 100 controls engine 300 in the manner that the all-cylinder operation is performed.

Figure 6A:
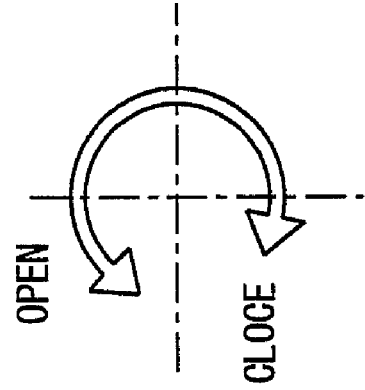
FIGS. 6A and 6B are each a diagram (No. 2) showing respective closing timings of intake valves in left and right banks.
Figure 6B:
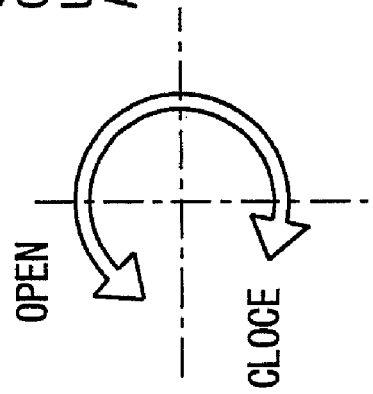

With reference to FIGS. 6A and 6B, a description is given of the operation of the engine ECU controlling engine 300 serving as the internal combustion engine in the present embodiment, based on the above described structure and flowchart.

After engine 300 is started, when the shift position is the D position (YES in S200), it is determined whether or not warm-up of engine 300 is completed (S202). When the warm-up and learning of the air-fuel ratio are completed (YES in S202 and YES in S204), and the vehicle speed, the engine speed and load satisfy predetermined conditions respectively (YES in S206, YES in S208 and YES in S210), it is determined whether or not the throttle is stable (S212). When the throttle is stable (YES in S212) and the catalyst temperature is equal to or higher than a predetermined temperature (YES in S214), the reduced-cylinder operation is performed as shown in FIG. 6A by deactivating the cylinder of right bank 308 while the combustion pressure in the cylinder of left bank 306 is used to operate engine 300 (S216). When any of the above-described conditions is not satisfied (NO in any of S200 to S216), the all-cylinder operation is continued with phase angles that are substantially in phase (S218) as shown in FIG. 6B.

As discussed above, in the internal combustion engine according to the present embodiment, the right bank has the most retarded phase angle with higher priority given to startability while the left bank has the most retarded phase angle with higher priority given to improvement in fuel economy. Thus, at the start of the engine, the cylinder of the right bank giving higher priority to startability is activated and accordingly excellent startability can be achieved. While the engine is operating, a switch is made to the left bank giving higher priority to improvement of fuel economy and accordingly fuel economy can be improved. In other words, for respective banks, respective most retarded phase angles different from each other may be set so as to give higher priority to startability or improvement in fuel economy. In this way, both of the ensured startability and the improved fuel economy can be achieved.

In particular, when the engine is stopped, the phase angle of the intake camshaft is changed to the most retarded phase angle. Thus, since higher priority is given to the startability to set the most retarded phase angle of the right bank to a phase angle with which the in-cylinder pressure that can start the engine is obtained, excellent startability can be obtained at the start of the internal combustion engine.

Further, control is performed in the manner that, after the cylinder in the right bank is activated, the cylinder in the left bank is activated. Accordingly, the engine is operated with all cylinders and thus an output requested to the vehicle can immediately be generated.

Furthermore, control is performed in the manner that, after the cylinder in the left bank is activated, the cylinder in the right bank is deactivated so that the engine is operated by the cylinder in the left bank. Therefore, the reduced-cylinder operation improves fuel economy. In addition, in the left bank, the closing timing of the intake valve can be retarded with respect to the right bank. Therefore, the actual compression ratio is lowered, the pumping loss is reduced and fuel economy is improved. In this way, both of the ensured startability and the improved fuel economy can be achieved.

Figure 7A:
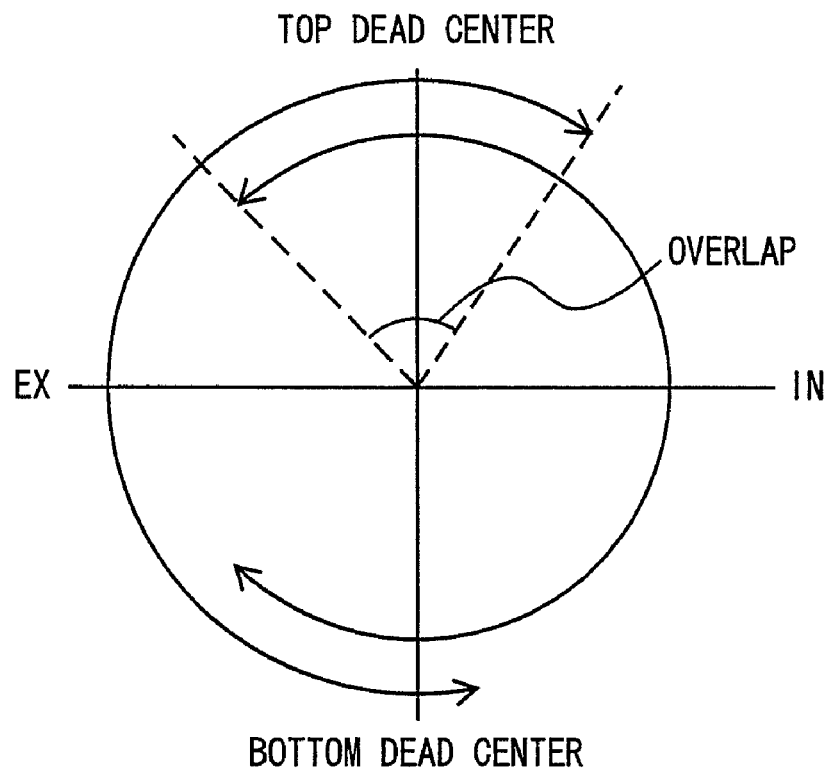
FIGS. 7A and 7B are each a diagram showing an overlap period of an intake valve and an exhaust valve.
Figure 7B:
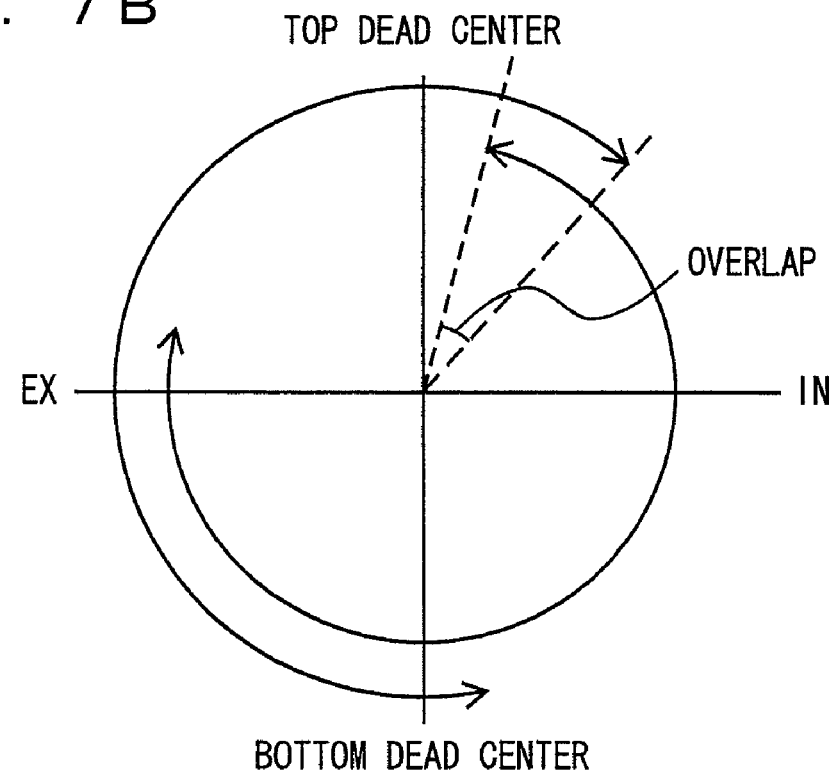

In particular, in the case where the engine is of the direct injection type and the period in which both of the intake valve and the exhaust valve are opened (so-called overlap period) occurs before the top dead center, namely while the piston is being moved upward, as shown in FIG. 7A, exhaust gas flows into the intake port so that deposit could be generated in the intake port. In contrast, as shown in FIG. 7B, in the case where the closing timing of the intake valve is retarded (the phase angle of the intake camshaft is shifted in the retard direction), the overlap period occurs after the top dead center, namely when the piston begins to move downward, exhaust gas does not flow into the intake port and thus generation of deposit in the intake port can be suppressed.

Second Embodiment

In the following, an internal combustion engine according to a second embodiment of the present invention is described. A vehicle on which the internal combustion engine in the present embodiment is mounted differs in structure from the vehicle on which the internal combustion engine in the first embodiment is mounted in that the former has an intermediate phase fixing mechanism that limits, when engine 300 is stopped, the phase angle of left bank 306 to a phase angle that is substantially equal to the most retarded phase angle of right bank 308. Components other than the above-described one are similar to those of the vehicle on which the internal combustion engine in the first embodiment is mounted. They are denoted by the same reference characters and they function identically. Therefore, the detailed description thereof is not repeated here.

In the present embodiment, the intermediate phase fixing mechanism is provided to left bank 306 having the most retarded phase angle retarded to a greater extent than right bank 308. The intermediate phase fixing mechanism limits, in the state where no oil pressure is exerted while engine 300 is stopped for example, the phase angle of intake camshaft 358 to a predetermined phase angle by the lock pin. The predetermined phase angle is, in the present embodiment, a phase angle substantially identical to the most retarded phase angle of right bank 308. Regarding right bank 308, in the state where no oil pressure is exerted while engine 300 is stopped, the phase angle of intake camshaft 360 is limited to the most retarded phase angle by the lock pin. Therefore, at the start of engine 300, respective phase angles of intake camshafts 358, 360 in the left and right banks are substantially identical to each other.

In the present embodiment, a feature is that engine ECU 100 controls engine 300 in the following manner. Specifically, in the case where engine ECU 100 determines that the intermediate phase fixing mechanism is abnormal while engine 300 is stopped, it deactivates, at the subsequent start of engine 300, the cylinder of left bank 306 to which the intermediate phase fixing mechanism is provided, and starts engine 300 with combustion pressure in the cylinder of right bank 308. "Intermediate phase fixing mechanism is abnormal" refers to the state where the lock pin does not normally operate while engine 300 is stopped so that the phase angle of intake camshaft 358 in left bank 306 is not limited to a predetermined phase angle.

In the following, referring to FIG. 8, a description is given of a control structure of a program according to which, when the engine ECU controlling engine 300 serving as the internal combustion engine in the present embodiment determines that the intermediate phase fixing mechanism is abnormal, it starts engine 300 with only the cylinder of right bank 308.

In S300, engine ECU 100 determines whether or not an instruction to stop engine 300 is given. When for example it is detected that an IG switch (not shown) is turned off by the driver, engine ECU 100 may determine that an instruction to stop the engine is given. When the instruction to stop engine 300 is given (YES in S300), the process proceeds to S304. Otherwise (NO in S300), the process proceeds to S302.

In S302, engine ECU 100 determines whether or not the engine speed of engine 300 is equal to or lower than a predetermined engine speed. Based on a detection signal provided by crank position sensor 102, engine ECU 100 detects the engine speed of engine 300. "Predetermined engine speed" refers to the engine speed at which engine 300 enters an engine stop mode (namely engine speed at which the engine stops). When the engine speed of engine 300 is equal to or lower than the predetermined engine speed (YES in S302), the process proceeds to S304. Otherwise (NO in S302), the process returns to S300.

In S304, engine ECU 100 detects the cam angle of left bank 306 by cam angle position sensor 108. In S306, engine ECU 100 determines whether or not the intermediate phase fixing mechanism is abnormal. Specifically, based on the rotational angle of crankshaft 352 detected by crank position sensor 102 and the rotational angle of intake camshaft 358 detected by cam angle position sensor 108, engine ECU 100 determines that the intermediate phase fixing mechanism is abnormal if the phase angle of intake camshaft 358 is not limited to an appropriate phase angle by the intermediate phase fixing mechanism. When the intermediate phase fixing mechanism is abnormal (YES in S306), the process proceeds to S308. Otherwise (NO in S306), the process proceeds to S310.

In S308, engine ECU 100 controls engine 300 in the manner that the cylinder of left bank 306 having the intermediate phase fixing mechanism provided thereto is stopped at the subsequent start of engine 300 and fuel is supplied to the cylinder of right bank 308 to start engine 300. In S310, engine ECU 100 controls engine 300, at the subsequent start of engine 300, in the manner that fuel is supplied to respective cylinders of left and right banks 306, 308 to start engine 300, as done for the normal start.

Referring to FIGS. 9A to 9D, a description is given of an operation of engine ECU 100 controlling engine 300 serving as the internal combustion engine according to the present embodiment, based on the above-described structure and flowchart.

It is supposed that the driver turns off the IG switch for example to give an instruction to stop engine 300 (YES in S300) or the engine speed of engine 300 becomes equal to or lower than a predetermined engine speed to allow engine 300 to enter the stop mode (YES in S302) and thereafter, based on the rotational angle of crankshaft 352 and the rotational angle of intake camshaft 358, it is determined that the intermediate phase fixing mechanism does not limit the phase angle to a predetermined phase angle (YES in S306) as shown in FIG. 9A. At the subsequent start, as shown in FIG. 9B, the combustion pressure in the cylinder of right bank 308 is used to start engine 300 (S308). In contrast, when the intermediate phase fixing mechanism limits the phase angle to the predetermined phase angle (NO in S306), at the subsequent start, the combustion pressure in respective cylinders of left and right banks 306, 308 is used to start engine 300 (S310) like the normal start as shown in FIG. 9C.

As described above, for the internal combustion engine according to the present embodiment, the intake camshaft of the left bank is limited, when the internal combustion engine is stopped, to a phase angle at which an in-cylinder pressure that can start the internal combustion engine is obtained. Accordingly, at the start of the internal combustion engine, respective cylinders of the left and right banks can be used to start the internal combustion engine and thus excellent startability can be obtained. Further, while the internal combustion engine is operating, the intake camshaft of the left bank can be changed to have a phase angle retarded to a greater extent with respect to the most retarded phase angle of the right bank. Thus, the intake valve can be closed later. Thus, the actual compression ratio is lowered and consequently the pumping loss can be reduced and fuel economy can be improved. In this way, the internal combustion engine can be provided that achieves both of the ensured startability and the improved fuel economy.

Preferably, after the engine is started, control is performed in the manner that the cylinder in the right bank is deactivated as shown FIG. 9D. By the one-bank operation (reduced-cylinder operation), fuel economy can be improved and further, the valve closing timing of the left bank can be retarded with respect to the right bank. Thus, the quantity of intake air into the cylinder can be reduced and accordingly the throttle valve can be opened to a greater extent. In this way, pumping loss is reduced and fuel economy is improved. The cylinder in the right bank may be deactivated when the engine satisfies a predetermined stop condition. In other words, the engine ECU may execute the program described in connection with the first embodiment with reference to FIG. 5, and the detailed description thereof is not repeated.

Further, when it is determined that an abnormal state occurs in the intermediate phase fixing mechanism and thus the phase angle of the intake camshaft is not limited to a predetermined phase angle, the engine ECU controls the engine in the manner that, at the start of the engine, the cylinder in the left bank having the intermediate phase fixing mechanism is deactivated. If the phase angle is not limited to the predetermined phase angle, it is highly possible that the phase angle of the camshaft is not the phase angle at which an in-cylinder pressure that can start the engine is obtained. Thus, the control is performed to deactivate the cylinder in the left bank and accordingly the engine is started by means of the cylinder in the right bank that ensures startability. Accordingly, excellent startability can be achieved.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. An internal combustion engine having a plurality of banks each having a cylinder provided to said banks, comprising:
   an intake valve provided between said cylinder and an intake manifold;
   a camshaft opening and closing said intake valve by means of mechanical power of said internal combustion engine; and
   a changing unit changing, according to an operating state of said internal combustion engine, a phase angle of said camshaft, said phase angle corresponding to a closing timing of said intake valve,
   said banks differing from each other in most retarded phase angle changed by said changing unit, and
   when said internal combustion engine is started, an in-cylinder pressure of a first bank of said plurality of banks that is determined based on a phase angle of said first bank is different from an in-cylinder pressure of a second bank different from said first bank that is determined based on a phase angle of said second bank.

2. The internal combustion engine according to claim 1, wherein
   one bank of said plurality of banks has said most retarded phase angle that is a phase angle at which an in-cylinder pressure that can start said internal combustion engine is obtained, said one bank differing from a retard-angle-side bank that is another one of said plurality of banks and that has said most retarded phase angle retarded to a greater extent than said most retarded phase angle of said one bank.

3. The internal combustion engine according to claim 1, further comprising a limiting unit provided to a retard-angle-side bank that is included in said plurality of banks and that has said most retarded phase angle retarded to a greater extent relative to another bank included in said plurality of banks, said limiting unit limiting said phase angle to a predetermined phase angle when said internal combustion engine is stopped.

4. The internal combustion engine according to claim 3, wherein
said predetermined phase angle is a phase angle at which an in-cylinder pressure that can start said internal combustion engine is obtained.

5. The internal combustion engine according to claim 3, further comprising a cylinder control unit performing control in a manner that the cylinder of one bank differing from said retard-angle-side bank is deactivated after said internal combustion engine is started.

6. The internal combustion engine according to claim 3, further comprising:
a determination unit determining whether said phase angle is limited to the predetermined phase angle when said internal combustion engine is stopped; and
a cylinder deactivation control unit performing control in a manner that, when it is determined that said phase angle is not limited to the predetermined phase angle, the cylinder of said bank with said limiting unit provided thereto is deactivated when said internal combustion engine is started.

7. The internal combustion engine according to claim 1, wherein
said changing unit includes a phase angle changing unit changing said phase angle to said most retarded phase angle when said internal combustion engine is stopped, and
said internal combustion engine further comprises a control unit performing control in a manner that the cylinder of one bank of said plurality of banks is activated when said internal combustion engine is started, said one bank differing from a retard-angle-side bank that is another one of said plurality of banks and that has said most retarded phase angle retarded to a greater extent than said most retarded phase angle of said one bank.

8. The internal combustion engine according to claim 7, further comprising an activation control unit performing control in a manner that the cylinder of said retard-angle-side bank is activated after the cylinder of said one bank is activated.

9. The internal combustion engine according to claim 8, further comprising a deactivation control unit performing control in a manner that the cylinder of said one bank is deactivated after the cylinder of said retard-angle-side bank is activated.

10. An internal combustion engine having a plurality of banks each having a cylinder provided to said banks, comprising:
an intake valve provided between said cylinder and an intake manifold;
a camshaft opening and closing said intake valve by means of mechanical power of said internal combustion engine; and
changing means for changing, according to an operating state of said internal combustion engine, a phase angle of said camshaft, said phase angle corresponding to a closing timing of said intake valve,
said banks differing from each other in most retarded phase angle changed by said changing means, and
when said internal combustion engine is started, an in-cylinder pressure of a first bank of said plurality of banks that is determined based on a phase angle of said first bank is different from an in-cylinder pressure of a second bank different from said first bank that is determined based on a phase angle of said second bank.

11. The internal combustion engine according to claim 10, wherein
one bank of said plurality of banks has said most retarded phase angle that is a phase angle at which an in-cylinder pressure that can start said internal combustion engine is obtained, said one bank differing from a retard-angle-side bank that is another one of said plurality of banks and that has said most retarded phase angle retarded to a greater extent than said most retarded phase angle of said one bank.

12. The internal combustion engine according to claim 10, further comprising limiting means provided to a retard-angle-side bank that is included in said plurality of banks and that has said most retarded phase angle retarded to a greater extent relative to another bank included in said plurality of banks, for limiting said phase angle to a predetermined phase angle when said internal combustion engine is stopped.

13. The internal combustion engine according to claim 12, wherein
said predetermined phase angle is a phase angle at which an in-cylinder pressure that can start said internal combustion engine is obtained.

14. The internal combustion engine according to claim 12, further comprising means for performing control in a manner that the cylinder of one bank differing from said retard-angle-side bank is deactivated after said internal combustion engine is started.

15. The internal combustion engine according to claim 12, further comprising:
determination means for determining whether said phase angle is limited to the predetermined phase angle when said internal combustion engine is stopped; and
means for performing control in a manner that, when it is determined that said phase angle is not limited to the predetermined phase angle, the cylinder of said bank with said limiting means provided thereto is deactivated when said internal combustion engine is started.

16. The internal combustion engine according to claim 10, wherein
said changing means includes means for changing said phase angle to said most retarded phase angle when said internal combustion engine is stopped, and
said internal combustion engine further comprises means for performing control in a manner that the cylinder of one bank of said plurality of banks is activated when said internal combustion engine is started, said one bank differing from a retard-angle-side bank that is another one of said plurality of banks and that has said most retarded phase angle retarded to a greater extent than said most retarded phase angle of said one bank.

17. The internal combustion engine according to claim 16, further comprising means for performing control in a manner that the cylinder of said retard-angle-side bank is activated after the cylinder of said one bank is activated.

18. The internal combustion engine according to claim 17, further comprising means for performing control in a manner that the cylinder of said one bank is deactivated after the cylinder of said retard-angle-side bank is activated.

* * * * *